United States Patent [19]

Nishide

[11] Patent Number: 5,402,337

[45] Date of Patent: Mar. 28, 1995

[54] METHOD AND APPARATUS FOR CONSTRUCTING THREE-DIMENSIONAL SURFACE SHADING IMAGE DISPLAY

[75] Inventor: Akihiko Nishide, Tokyo, Japan

[73] Assignee: Kabushiki Kaisha Toshiba, Tokyo, Japan

[21] Appl. No.: 918,038

[22] Filed: Jul. 24, 1992

[30] Foreign Application Priority Data

Jul. 24, 1991 [JP] Japan .................. 3-184309

[51] Int. Cl.$^6$ ............................................ G06F 15/62
[52] U.S. Cl. ...................... 364/413.13; 364/413.14; 364/413.16; 364/413.19; 364/413.22; 382/6; 382/44; 382/49; 345/149; 395/124; 395/126; 250/363.02; 250/363.04
[58] Field of Search ............... 364/413.13, 413.19, 364/413.22, 413.14, 413.15, 413.16, 413.17, 413.18, 413.23; 250/363.02, 363.03, 363.04, 363.07, 363.08; 382/6, 41, 44, 46, 47, 48, 49, 50; 345/149; 395/124, 126; 128/630, 653.1, 653.2, 659, 660.01, 660.07, 662.02, 664, 665

[56] References Cited

U.S. PATENT DOCUMENTS

| | | | |
|---|---|---|---|
| 4,879,652 | 11/1989 | Nowak ........................... | 364/413.18 |
| 5,046,108 | 9/1991 | Inoue et al. .................. | 382/6 |
| 5,125,045 | 6/1992 | Murakami et al. .................... | 382/50 |
| 5,150,427 | 9/1992 | Frazee et al. ........................ | 382/48 |
| 5,201,012 | 4/1993 | Hisano et al. ........................ | 382/50 |
| 5,229,935 | 7/1993 | Yamagishi et al. ............. | 364/413.22 |
| 5,233,299 | 8/1993 | Souza et al. ......................... | 324/307 |

Primary Examiner—Gail O. Hayes
Assistant Examiner—Joseph Thomas
Attorney, Agent, or Firm—Oblon, Spivak, McClelland, Maier, & Neustadt

[57] ABSTRACT

A method and an apparatus for constructing three-dimensional surface shading image display from three-dimensional sequential tomographic images, capable of obtaining the distance image at a high speed by using a hardware configuration with a high general applicability. In the apparatus, an individual distance image for each of the tomographic images with respect to a predetermined reference plane is constructed; a synthesized distance image in which the individual distance images for all of the tomographic images are synthesized together is constructed, by sequentially carrying out an image extrema calculation between each individual distance image for each tomographic image and a previous synthesized distance image; a distance image for surface shading is constructed by applying an affine transformation to the synthesized distance image; and a surface shading image is obtained by applying a shading process to the distance image for surface shading. The image extrema calculation can be either an image minima calculation or an image maxima calculation.

11 Claims, 5 Drawing Sheets

$Dx = \cos\theta \cdot Dz/\tan\phi$ $Dy = \sin\theta \cdot Dz/\tan\phi$ $$\begin{pmatrix} X \\ Y \end{pmatrix} = \begin{pmatrix} \cos(90°-\theta) & -\sin(90°-\theta) \\ \sin(90°-\theta) & \cos(90°-\theta) \end{pmatrix} \begin{pmatrix} x \\ y \end{pmatrix}$$

$$\begin{pmatrix} X' \\ Y' \end{pmatrix} = \begin{pmatrix} 1 & 0 \\ 0 & \sin\phi \end{pmatrix} \begin{pmatrix} X \\ Y \end{pmatrix}$$

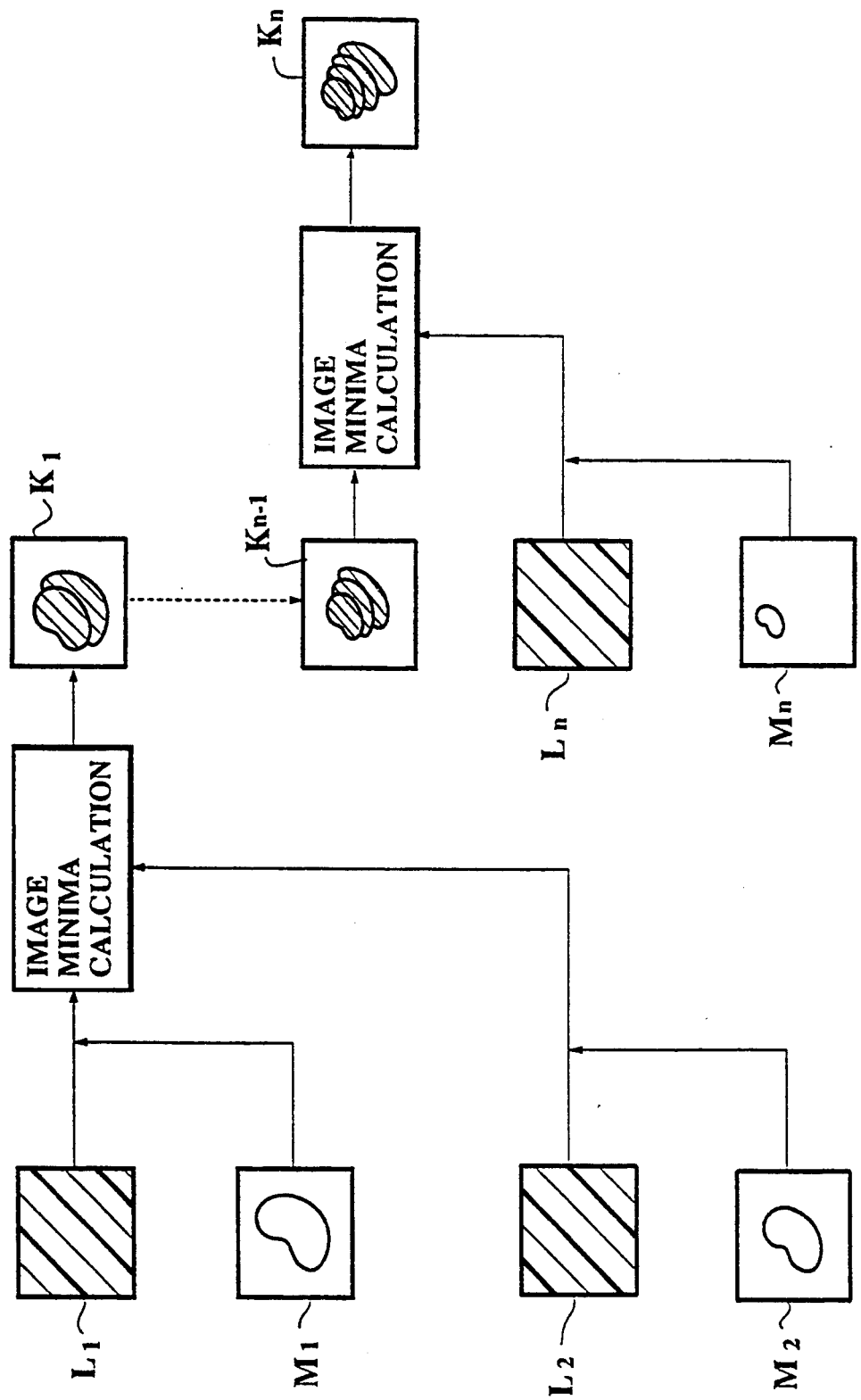

METHOD AND APPARATUS FOR CONSTRUCTING THREE-DIMENSIONAL SURFACE SHADING IMAGE DISPLAY

BACKGROUND OF THE INVENTION

1. Field of the Invention

The present invention relates to a method and an apparatus for constructing images for a three-dimensional surface shading image display obtained from three-dimensional sequential tomographic images collected by an X-ray CT (Computed Tomography) apparatus, NMR (Nuclear Magnetic Resonance) imaging apparatus, or ultrasonic tomography imaging apparatus.

2. Description of the Background Art

In recent years, has become popular to construct a three-dimensional surface shading image display from the three-dimensional voxel data representing the sequential tomographic images obtained by a tomographic imaging apparatus such as an X-ray CT apparatus.

In such a three-dimensional surface shading image display, it is necessary to construct a three-dimensional distance image (referred to hereafter simply as a distance image) as an intermediate data, in order to achieve the three-dimensional image construction. This distance image has conventionally been constructed by the so called ray tracing method which is usually implemented in a form of a computer software, as described by Herman and Liu in "Three-dimensional display of human organs from computed tomograms" Comput Graphics Image Processing 9, pp. 1–21, 1979.

However, such a conventional method of constructing the distance image by using the computer software has been associated with a problem that the processing speed is slow so that a considerable amount of time has been required for the construction of the distance image.

There has also been a proposition for a specialized hardware configuration for realizing the ray tracing method to construct the distance image. However, such a hardware configuration inevitably becomes highly specialized for that purpose alone, so that there has been a drawback that an image construction apparatus adopting such a specialized hardware configuration would have a very poor general applicability.

SUMMARY OF THE INVENTION

It is therefore an object of the present invention to provide a method and an apparatus for constructing a three-dimensional surface shading image display from three-dimensional sequential tomographic images, capable of obtaining the distance image at a high speed by using a hardware configuration with a high general applicability.

According to one aspect of the present invention there is provided an apparatus for constructing a three-dimensional surface shading image display from three-dimensional sequential tomographic images, comprising: individual distance image constructing means for constructing an individual distance image for each of the tomographic images with respect to a predetermined reference plane; synthesized distance image constructing means for constructing a synthesized distance image in which the individual distance images for all of the tomographic images constructed by the individual distance image constructing means are synthesized together, by sequentially carrying out an image extrema calculation between each m-th individual distance image for each m-th tomographic image and a previous synthesized distance image in which the previous individual distance images for up to (m−1)-th tomographic image are synthesized together, where m is an integer and the image extrema calculation calculates an extremum value for each picture element in the individual distance images; surface shading distance image constructing means for constructing a distance image for surface shading in a predetermined shape by applying an affine transformation to the synthesized distance image constructed by the synthesized distance image constructing means; and shading process means for obtaining a surface shading image by applying a shading process to the distance image for surface shading constructed by the surface shading distance image constructing means.

According to another aspect of the present invention there is provided a method of constructing a three-dimensional surface shading image display from three-dimensional sequential tomographic images, comprising the steps of: (a) constructing an individual distance image for each of the tomographic images with respect to a predetermined reference plane; (b) constructing a synthesized distance image in which the individual distance images for all of the tomographic images constructed at the step (a) are synthesized together, by sequentially carrying out an image extrema calculation between each m-th individual distance image for each m-th tomographic image and a previous synthesized distance image in which the previous individual distance images for up to (m−1)-th tomographic image are synthesized together, where m is an integer and the image extrema calculation calculates an extremum value for each picture element in the individual distance images; (c) constructing a distance image for surface shading in a predetermined shape by applying an affine transformation to the synthesized distance image constructed at the step (c); and (d) obtaining a surface shading image by applying a shading process to the distance image for surface shading constructed at the step (c).

Other features and advantages of the present invention will become apparent from the following description taken in conjunction with the accompanying drawings.

BRIEF DESCRIPTION OF THE DRAWINGS

FIG. 5 is an illustrative diagram indicating a process of constructing a synthesized distance image in the procedure indicated by FIG. 4.

DETAILED DESCRIPTION OF THE PREFERRED EMBODIMENTS

Figure 1:
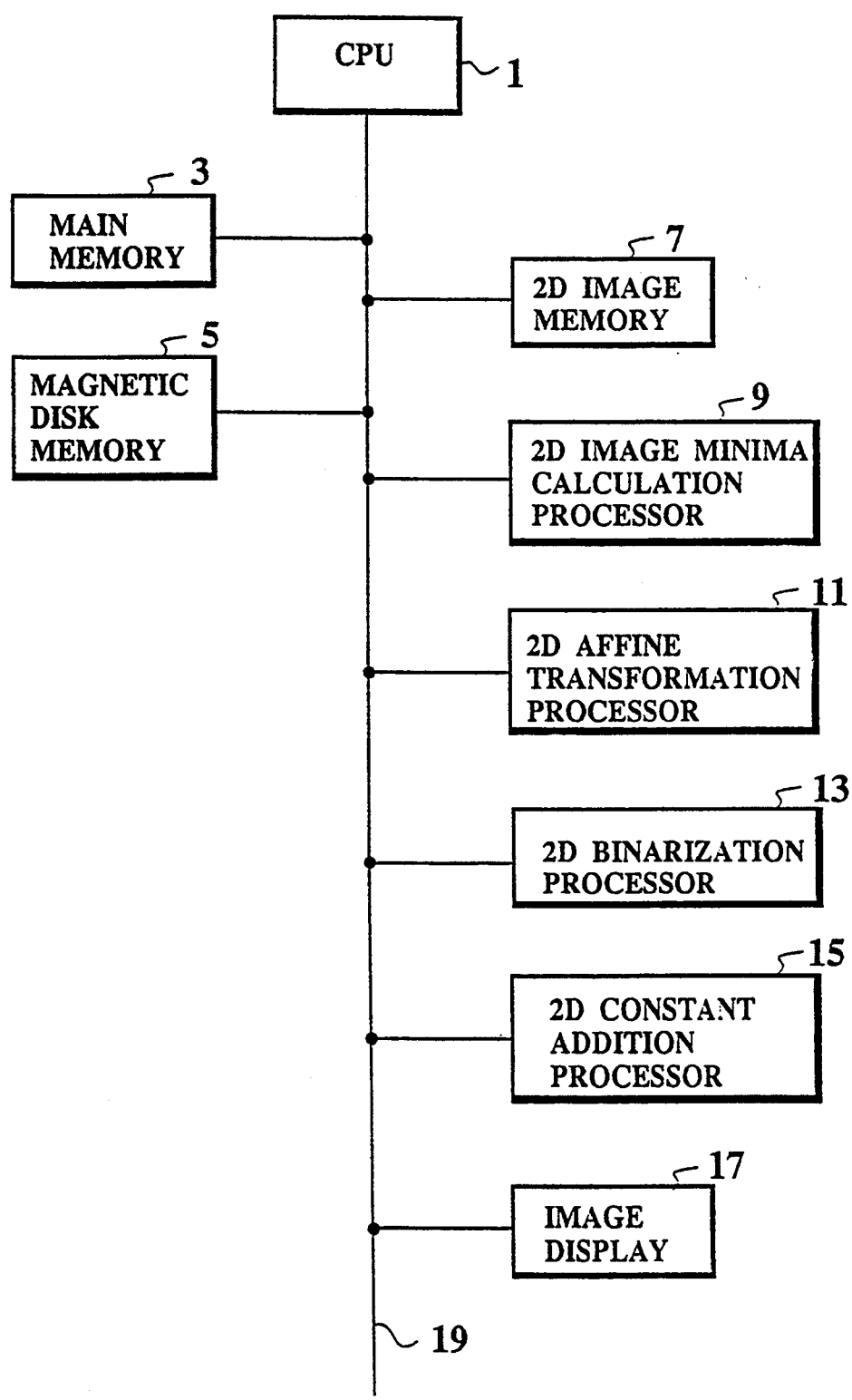
FIG. 1 is a schematic block diagram of one embodiment of the apparatus for constructing the three-dimensional surface shading image display according to the present invention.

Referring now to FIG. 1, one embodiment of the apparatus for constructing a three-dimensional surface shading image display according to the present invention will be described in detail.

In this embodiment shown in FIG. 1, the apparatus comprises a central processing unit (CPU) 1 for carrying out various data processing and coordinating the operations of various components of the apparatus described below; a main memory 3; a magnetic disk memory 5; a two-dimensional image memory 7; a two-dimensional image minima calculation processor 9; a two-dimensional affine transformation processor 11; a two-dimensional binarization processor 13; a two-dimensional constant addition processor 15; and an image display 17, all of which are mutually connected through a common data bus 19. The entire configuration of this apparatus of FIG. 1 can be implemented, for example, in a general image processing system called TOSPIX manufactured by Toshiba, by appropriately realizing the functions of the components of the apparatus of FIG. 1 in this general image processing system.

The magnetic disk memory 5 memorizes an operating system (OS) for the CPU 1, an image construction program implementing the method of constructing three-dimensional surface shading image display according to the present invention, and the sequential tomographic images obtained by an imaging apparatus such as an X-ray CT apparatus.

The main memory 3 stores the image construction program to be executed by the CPU 1 which is transferred from the magnetic disk memory 5.

The two-dimensional image memory 7 functions as an image buffer for the input and output image data of the two-dimensional image minima calculation processor 9, the two-dimensional affine transformation processor 11, the two-dimensional binarization processor 13, and the two dimensional constant addition processor 15, as well as for the sequential tomographic images outputted from the magnetic disk memory 5.

The two-dimensional image minima calculation processor 9 is a processor for comparing picture elements of two of the two-dimensional input images $g_1(x, y)$ and $g_2(x, y)$ at each corresponding position, and selecting one of the picture elements which has a smaller picture element value as an output, so as to construct an output image $g_{0A}(x, y)$.

Figure 2:
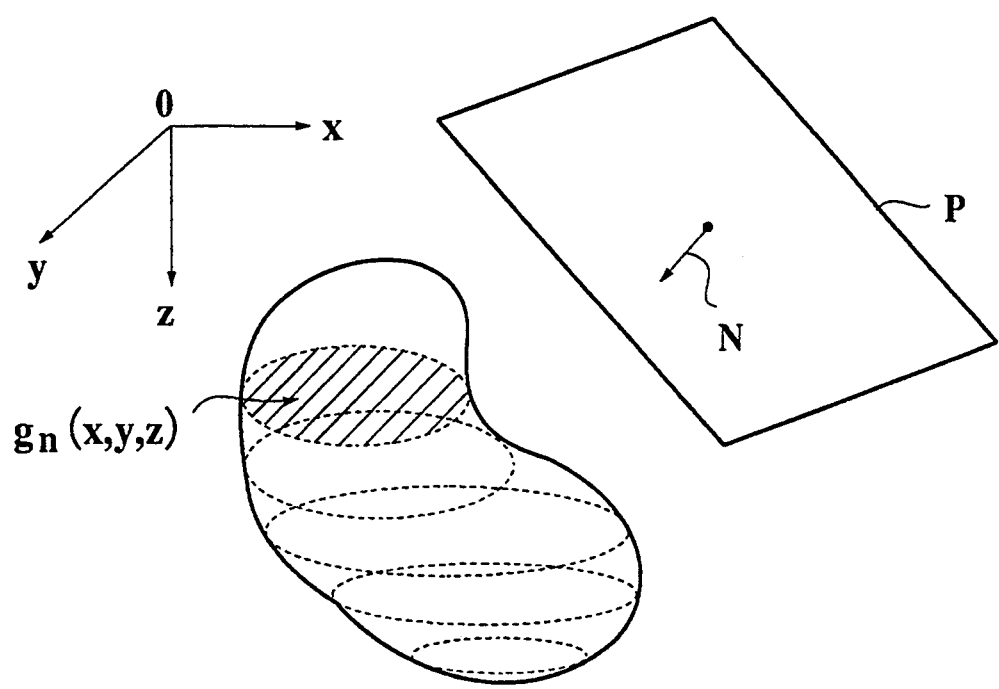
FIG. 2 is a diagram indicating a relationship between a reference plane and tomographic image slice planes to be used in the apparatus of FIG. 1.

More specifically, as shown in FIG. 2, let a reference plane P which is given in the CPU 1 in advance in order to define the viewing direction in the three-dimensional surface shading image display be expressed by the equation $ax + by + cz + d = 0$.

Figure 3A:
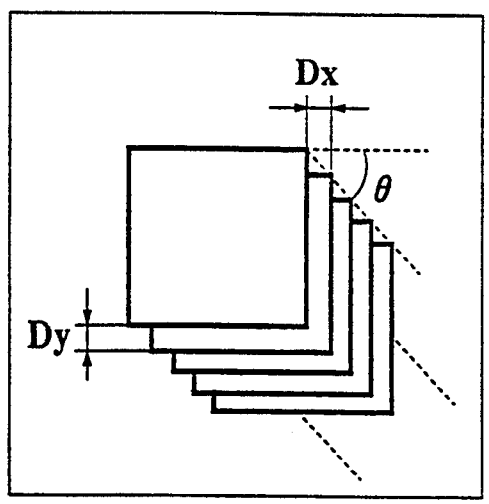
FIGS. 3A, 3B, and 3C are sequential illustrative diagrams indicating the image data in a course of a three-dimensional surface shading image construction procedure used in the apparatus of FIG. 1.
Figure 3A:
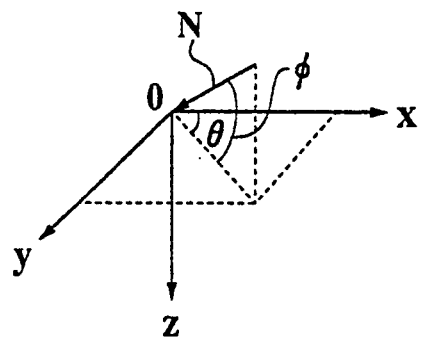

Now, the three-dimensional surface shading image to be obtained is that which is viewed from a direction of a normal vector N of the reference plane P, so that, as shown in FIG. 3A, each tomographic image defined with respect to the predetermined coordinate system must be displaced by $Dx = \cos\theta \cdot Dz/\tan\phi$ in the x-direction and by $Dy = \sin\theta \cdot /\tan\phi$ in the y direction, where Dz is a distance between the successive tomographic image slice planes, in order to simulate the view from the direction of the normal vector N.

Then, for two of the two-dimensional input images $g_1(x, y)$ and $g_2(x, y)$ incorporating such displacements, the two-dimensional image minima calculation defined by the following equation (1) is carried out by the two-dimensional image minima calculation processor 9.

$$g_{0A}(x,y) = \min[g_1(x,y), g_2(x,y)] = [g_1(x,y) + g_2(x,y) - |g_1(x,y) - g_2(x,y)|]/2 \quad (1)$$

The two-dimensional affine transformation processor 11 carries out the affine transformation defined by the following equation (2) with respect to the picture element at the input coordinates (x, y) to obtain the picture element at the output coordinates (X, Y).

$$\begin{pmatrix} X \\ Y \end{pmatrix} = \begin{pmatrix} a & b \\ c & d \end{pmatrix}\begin{pmatrix} x \\ y \end{pmatrix} + \begin{pmatrix} e \\ f \end{pmatrix} \quad (2)$$

where e and f are values appropriately determined according to a parallel displacement of the image.

Figure 3B:
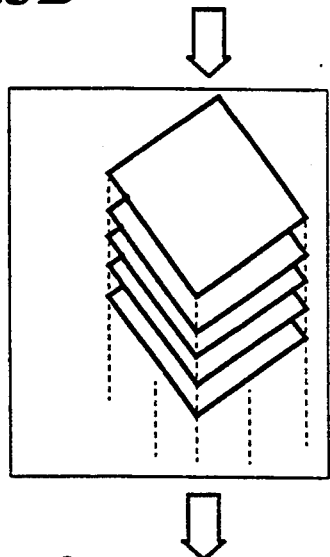

As an example, in order to rotate the input image $g_i(x, y)$ by an angle of $(90° - \theta)$ as shown in FIG. 3B, the matrix elements a, b, c, and d in the equation (2) can be set as follows.

$$\left.\begin{array}{l} a = \cos(90° - \theta) \\ b = -\sin(90° - \theta) \\ c = \sin(90° - \theta) \\ d = \cos(90° - \theta) \end{array}\right\} \quad (3)$$

Figure 3C:
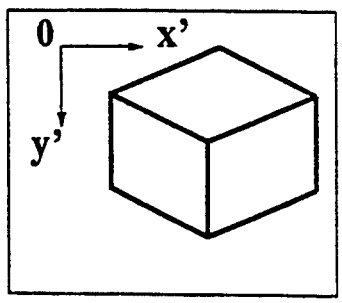

Similarly, as another example, in order to compress the input image $g_i(x, y)$ in the Y direction by $\sin\phi$ as shown in FIG. 3C, the matrix elements a, b, c, and d in the equation (2) can be set as follows.

$$\left.\begin{array}{l} a = 1 \\ b = 0 \\ c = 0 \\ d = \sin\phi \end{array}\right\} \quad (4)$$

The two-dimensional binarization processor 13 carries out the binarization of the input image $g_i(x, y)$ by using a predetermined threshold value T to obtain the binarized output image $g_{0B}(x, y)$ according to the following equation (5).

$$\left.\begin{array}{l} g_{0B} = 255 \quad \text{when } g_i(x,y) \geq T \\ g_{0B} = 0 \quad \text{when } g_i(x,y) < T \end{array}\right\} \quad (5)$$

where $g_{0B} = 255$ is a picture element value which corresponds to a binary value of 1 while $g_{0B} = 0$ is a picture element value which corresponds to a binary value of 0 in this embodiment.

The two-dimensional constant addition processor 15 carries out an operation to add a predetermined constant bias value B defined by the following equation (6) with respect to the input image $g_i(x, y)$ to obtain the output image $g_{0C}(X, y)$.

$$g_{0C}(x, y) = g_i(x, y) + B \quad (6)$$

The image display 17 for displaying the three-dimensional surface shading image obtained in the apparatus can be formed by a CRT for example.

Figure 4:
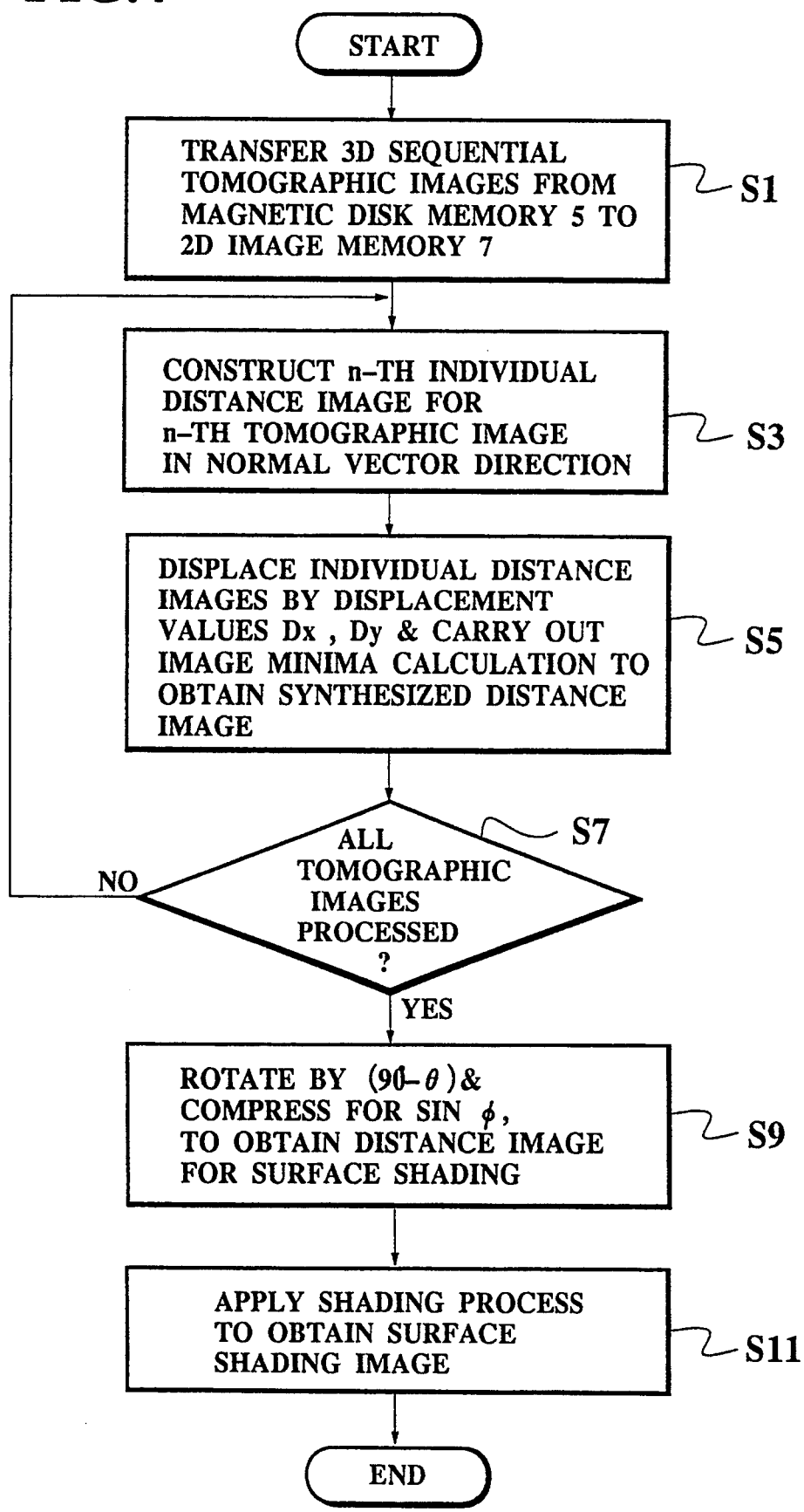
FIG. 4 is a flow chart for a three-dimensional surface shading image construction procedure used in the apparatus of FIG. 1, which embodies the method of constructing the three-dimensional surface shading image display according to the present invention.

Referring now to the flow chart of FIG. 4, the operation of the apparatus of FIG. 1 embodying the method of constructing three-dimensional surface shading image display according to the present invention will be described in detail.

First, at the step S1, the three-dimensional sequential tomographic images obtained by an imaging apparatus such as an X-ray CT apparatus are read out from the magnetic disk memory 5, and transferred to the two-dimensional image memory 7 to be stored there.

Next, at the step S3, the n-th individual distance image $L_n(x, y)$ for the n-th tomographic image in a direction of the normal vector N of the reference plane P is constructed as follows.

First, at the CPU 1, in order to construct the first individual distance image $L_1(x, y)$ for the first tomographic image, distances l1, l2, l3, and l4 from four corners (0, 0), (511, 0), (0, 511), and (511, 511) of the first tomographic image to the reference plane P are obtained, and a four picture element image constructed from the obtained distances l1, l2, l3, and l4 as the picture element values for its four picture elements is formed.

Then, this four picture element image is expanded 256×256 times by using a linear interpolation at the two-dimensional affine transformation processor 11, so as to obtain the first individual distance image $L_1(x, y)$ of 512×512 pixels for the first tomographic image.

More specifically, the two-dimensional affine transformation processor 11 obtains the first individual distance image $L_1(x, y)$ as follows.

Consider a case in which the relationship between the input and the output of the affine transformation is given by:

$$\begin{pmatrix} X \\ Y \end{pmatrix} = \begin{pmatrix} a & b \\ c & d \end{pmatrix}\begin{pmatrix} x \\ y \end{pmatrix} = M\begin{pmatrix} x \\ y \end{pmatrix} \quad (7)$$

Then, the two-dimensional affine transformation processor 11 first obtains the input (x, y)=(0, 0) to (1, 1), $0 \leq x \leq 1$ and $0 \leq y \leq 1$, corresponding to the desired output (X, Y)=(0, 0) to (511, 511), by calculating:

$$\begin{pmatrix} x \\ y \end{pmatrix} = M^{-1}\begin{pmatrix} X \\ Y \end{pmatrix} \quad (8)$$

Then, the two-dimensional affine transformation processor 11 expands the four picture element image formed from the four distances l1, l2, l3, and l4, for 512×512 times, so as to obtain the first individual distance image $L_1(x, y)$ according to:

$$L_1(x, y) = (1-y)((1-x)l1 + xl2) + y((1-x)l3 + xl4) \quad (9)$$

As for the subsequent individual distance images, the n-th individual distance image $L_n(x, y)$ for the n-th tomographic image (n greater than 1) in a direction of the normal vector N of the reference plane P is constructed from the first individual distance image $L_1(x, y)$ at the two-dimensional constant addition processor 15, as follows.

Namely, in general, with respect to the reference plane defined as $ax+by+cz+d=0$, the n-th individual distance image $L_n(x, y)$ for the n-th tomographic image $g_n(x, y, z)$ can be expressed as:

$$L_n(x,y) = (ax + by + cz + d)/\sqrt{a^2 + b^2 + c^2} \quad (10)$$

Here, the interval between the successive tomographic image slice planes takes a constant value Dz, so that the z-coordinate of the n-th tomographic image can be set to be n.Dz. Then, the equation (10) can be rewritten as:

$$\begin{aligned} L_n(x,y) &= (ax + by + c \cdot n \cdot Dz + d)/\sqrt{a^2 + b^2 + c^2} \\ &= L_{n-1}(x,y) + c \cdot Dz/\sqrt{a^2 + b^2 + c^2} \\ &= L_{n-1}(x,y) + Dz_1 \end{aligned} \quad (11)$$

where $Dz_1 = c \cdot Dz/\sqrt{a^2 + b^2 + c^2}$ is a constant.

Thus, the second individual distance image $L_2(x, y)$, for instance, is calculated by the two-dimensional constant addition processor 15 from the first individual distance image $L_1(x, y)$ according to:

$$L_2(x, y) = L_1(x, y) + Dz_1 \quad (12)$$

By means of the subsequent step S7, this procedure for obtaining the individual distance image for the subsequent tomographic image by the two-dimensional constant addition processor 15 is repeated at the step S3 for all the tomographic images.

Next, at the step S5, the displacement values Dx and Dy in the x and y directions of the predetermined two-dimensional coordinate system between the successive tomographic images when viewed from a direction of the normal vector N of the reference plane P are obtained, and then the corresponding successive individual distance images are displaced from each other by the obtained displacement values Dx and Dy, at the CPU 1, as shown in FIG. 3A.

Then, the image minima calculation between the successive individual distance images is carried out at the two-dimensional image minima calculation processor 9, so as to obtain a synthesized distance image in which the successive individual distance images for the successive tomographic images are synthesized together.

Here, as shown in FIG. 5, in carrying out the image minima calculation, each of the successive individual distance images $L_1$ and $L_2$, for instance, are masked by mask images $M_1$ and $M_2$, which are obtained by binarizing these successive individual distance images $L_1$ and $L_2$ at the two-dimensional binarization processor 13 by using a predetermined binarization threshold which is sufficient for extracting the outline of each individual distance image.

In a similar manner, the step S5 described above is carried out for all the subsequent individual distance images, by carrying out the image minima calculation between each m-th individual distance image masked by the corresponding mask images $M_m$ and the previous synthesized distance image $K_{m-1}$ in which the previous individual distance images $L_1$ to $L_{m-1}$ for up to the previous (m−1)-th tomographic image are synthesized, so as to finally obtain the synthesized distance image $K_n$ in which the individual distance images for all of the tomographic images are synthesized together, as shown in FIG. 5. In the individual distance images shown in FIG. 5, the coarse shading near the upper left corner of each individual distance image indicates the larger gray scale picture element value, while the dense shading near the lower right corner of each individual distance image indicates the smaller gray scale picture element value.

Next, at the step S9, the synthesized distance image $K_n$ obtained at the step S7 is rotated by an angle $(90° - \theta)$ at the two-dimensional arline transformation processor 11 in order to adjust a viewing angle, as shown in FIG. 3B, and then the rotated synthesized distance image $K_n$ is compressed for sin $\phi$ in the y' direction at the two-dimensional affine transformation processor 11 in order to adjust a scale, as shown in FIG. 3C, so as to obtain the distance image for surface shading.

Finally, at the step S11, the shading process is applied to the distance image for surface shading obtained at the step S9 by the CPU 1, so as to obtain the three-dimensional surface shading image, which is subsequently displayed on the image display 17.

It is to be noted that, the image minima calculation used in the embodiment described above is only an example of an image extrema calculation for calculating an extremum value for each picture element in the individual distance images, so that the two-dimensional image minima calculation processor 9 may be replaced by an image maxima calculation processor for calculating a maximum value for each picture element in the individual distance images. In a case the image maxima calculation is used, the resulting synthesized distance image will be that which is viewed from an opposite side of the reference plane P in a direction opposite to the normal vector N.

Besides this, many modifications and variations of the above embodiments may be made without departing from the novel and advantageous features of the present invention. Accordingly, all such modifications and variations are intended to be included within the scope of the appended claims.

What is claimed is:

1. An apparatus for constructing three-dimensional surface shading image display from three-dimensional sequential tomographic images, comprising:
    individual distance image constructing means for constructing an individual distance image for each of the tomographic images with respect to a predetermined reference plane;
    synthesized distance image constructing means for constructing a synthesized distance image in which the individual distance images for all of the tomographic images constructed by the individual distance image constructing means are synthesized together, by sequentially carrying out an image extrema calculation between each m-th individual distance image for each m-th tomographic image and a previous synthesized distance image in which the previous individual distance images for up to (m−1)-th tomographic image are synthesized together, where m is an integer and the image extrema calculation calculates an extremum value for each picture element in the individual distance images;
    surface shading distance image constructing means for constructing a distance image for surface shading in a predetermined shape by applying an affine transformation to the synthesized distance image constructed by the synthesized distance image constructing means; and
    shading process means for obtaining a surface shading image by applying a shading process to the distance image for surface shading constructed by the surface shading distance image constructing means.

2. The apparatus of claim 1, wherein the individual distance image constructing means constructs the individual distance image for the first tomographic image with respect to a predetermined reference plane first, and then constructs the individual distance images for the tomographic images other than the first tomographic image from the constructed individual distance image for the first tomographic image.

3. The apparatus of claim 2, wherein the individual distance image constructing means further comprises:
    affine transformation means for obtaining the individual distance image for the first tomographic image by transforming a four picture element image into a desired size, where the four picture element image is formed from four distance values of four corners of the first tomographic image with respect to the reference plane as picture element values; and
    constant addition means for obtaining the individual distance image for an n-th tomographic image by adding a predetermined constant value to the individual distance image for an (n−1)-th tomographic image, where n is an integer greater than 1.

4. The apparatus of claim 1, wherein the synthesized distance image constructing means carries out the image extrema calculation after obtaining displacement values between the successive tomographic images with respect to a predetermined two-dimensional coordinates when viewed from a direction of a normal vector of the reference plane, and displacing the successive individual distance images from each other by the obtained displacement values.

5. The apparatus of claim 1, wherein the synthesized distance image constructing means includes a binarization means for obtaining a mask image by binarizing each tomographic image, and the image extrema calculation is carried out for the individual distance images masked by the mask images obtained by the binarization means for the tomographic images.

6. The apparatus of claim 1, wherein the surface shading distance image constructing means applies a rotation by a predetermined angle in order to adjust a viewing angle and an affine transformation for compression by a predetermined size in order to adjust a scale, to the synthesized distance image.

7. The apparatus of claim 1, wherein the image extrema calculation carried out by the synthesized distance image constructing means is an image minima calculation for calculating a minimum value for each picture element in the individual distance images.

8. The apparatus of claim 1, wherein the image extrema calculation carried out by the synthesized distance image constructing means is an image maxima calculation for calculating a maximum value for each picture element in the individual distance images.

9. A method of constructing three-dimensional surface shading image display from three-dimensional sequential tomographic images, comprising the steps of:
    (a) constructing an individual distance image for each of the tomographic images with respect to a predetermined reference plane;
    (b) constructing a synthesized distance image in which the individual distance images for all of the tomographic images constructed at the step (a) are synthesized together, by sequentially carrying out an image extrema calculation between each m-th individual distance image for each m-th tomographic image and a previous synthesized distance image in which the previous individual distance images for up to (m−1)-th tomographic image are synthesized together, where m is an integer and the image extrema calculation calculates an extremum value for each picture element in the individual distance images;

(c) constructing a distance image for surface shading in a predetermined shape by applying an affine transformation to the synthesized distance image constructed at the step (c); and (d) obtaining a surface shading image by applying a shading process to the distance image for surface shading constructed at the step (c).

10. The method of claim 9, wherein the image extrema calculation carried out at the step (b) is an image minima calculation for calculating a minimum value for each picture element in the individual distance images.

11. The method of claim 9, wherein the image extrema calculation carried out at the step (b) is an image maxima calculation for calculating a maximum value for each picture element in the individual distance images.

* * * * *